(12) United States Patent
Liu

(10) Patent No.: US 11,366,292 B2
(45) Date of Patent: Jun. 21, 2022

(54) CAMERA OPTICAL LENS

(71) Applicant: AAC Optics (Suzhou) Co., Ltd., Suzhou (CN)

(72) Inventor: Yunjie Liu, Shenzhen (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 32 days.

(21) Appl. No.: 17/134,507

(22) Filed: Dec. 28, 2020

(65) Prior Publication Data

US 2022/0066141 A1 Mar. 3, 2022

(30) Foreign Application Priority Data

Sep. 2, 2020 (CN) .......................... 202010910966.4

(51) Int. Cl.
*G02B 13/00* (2006.01)
*G02B 9/14* (2006.01)
*G02B 13/06* (2006.01)
*G02B 27/00* (2006.01)

(52) U.S. Cl.
CPC ........... *G02B 13/0035* (2013.01); *G02B 9/14* (2013.01); *G02B 13/06* (2013.01); *G02B 27/0025* (2013.01)

(58) Field of Classification Search
CPC ........ G02B 9/14; G02B 9/16; G02B 13/0035; G02B 13/06; G02B 27/0025
See application file for complete search history.

*Primary Examiner* — Jack Dinh
(74) *Attorney, Agent, or Firm* — W&G Law Group

(57) ABSTRACT

A camera optical lens is provided, including from an object side to an image side: a first lens having positive refractive power; a second lens having negative refractive power; and a third lens having positive refractive power, wherein the camera optical lens satisfies following conditions: $0.75 \leq f1/f \leq 0.95$; $1.20 \leq f3/f \leq 2.00$; $0 \leq (R1+R2)/(R1-R2) \leq 0.80$; $-3.50 \leq (R3+R4)/(R3-R4) \leq -1.50$; $-8.00 \leq (R5+R6)/(R5-R6) \leq -2.50$; and $1.50 \leq d5/d4 \leq 4.00$. The above camera optical lens can meet design requirements for large aperture, wide angle and ultra-thinness while maintaining good imaging performance.

10 Claims, 12 Drawing Sheets

CAMERA OPTICAL LENS

TECHNICAL FIELD

The present invention relates to the technical field of optical lens and, in particular, to a camera optical lens suitable for handheld terminal devices such as smart phones or digital cameras, and imaging devices such as monitors or PC lenses.

BACKGROUND

With the emergence of smart phones in recent years, the demand for miniature camera lens is continuously increasing, but in general, photosensitive devices of a camera lens are nothing more than a Charge Coupled Device (CCD) or a Complementary Metal-Oxide Semiconductor Sensor (CMOS sensor), and with progress of semiconductor manufacturing technology, a pixel size of the photosensitive devices is becoming smaller, in addition, a current development trend of electronic products requires better performance with thinner and smaller dimensions, miniature camera lenses with good imaging quality therefore have become a mainstream in the market.

In order to obtain better imaging quality, a camera lens traditionally equipped in a camera of a mobile phone generally consists of three lenses. Although the common camera lens constituted by three lenses already has good optical performances, its configurations such as refractive power, lens spacing and lens shape still need to be optimized, therefore the camera lens may not meet design requirements for some optical performances such as large aperture, ultra thinness and wide angle while maintaining good imaging performance.

SUMMARY

In view of the above problems, the present invention provides a camera optical lens, which can meet design requirements for large aperture, wide angle and ultra-thinness while maintaining good imaging performance.

Embodiments of the present invention provide a camera optical lens, including from an object side to an image side:
a first lens having positive refractive power;
a second lens having negative refractive power; and
a third lens having positive refractive power,
wherein the camera optical lens satisfies following conditions:

$0.75 \leq f1/f \leq 0.95$;

$1.20 \leq f3/f \leq 2.00$;

$0 \leq (R1+R2)/(R1-R2) \leq 0.80$;

$-3.50 \leq (R3+R4)/(R3-R4) \leq -1.50$;

$-8.00 \leq (R5+R6)/(R5-R6) \leq -2.50$; and $1.50 \leq d5/d4 \leq 4.00$, where
f denotes an total focal length of the camera optical lens;
f1 denotes a focal length of the first lens;
f3 denotes a focal length of the third lens;
R1 denotes a curvature radius of an object side surface of the first lens;
R2 denotes a curvature radius of an image side surface of the first lens;
R3 denotes a curvature radius of an object side surface of the second lens;
R4 denotes a curvature radius of an image side surface of the second lens;
R5 denotes a curvature radius of an object side surface of the third lens;
R6 denotes a curvature radius of an image side surface of the third lens;
d4 denotes an on-axis distance from the image side surface of the second lens to the object side surface of the third lens; and
d5 denotes an on-axis thickness of the third lens.

As an improvement, the camera optical lens further satisfies a following condition:

$-1.20 \leq f2/f \leq -0.90$, where f2 denotes a focal length of the second lens.

As an improvement, the camera optical lens further satisfies a following condition:

$1.00 \leq d1/d2 \leq 2.00$, where
d1 denotes an on-axis thickness of the first lens; and
d2 denotes an on-axis distance from the image side surface of the first lens to the object side surface of the second lens.

As an improvement, the camera optical lens further satisfies a following condition:

$0.08 \leq d1/TTL \leq 0.28$, where
d1 denotes an on-axis thickness of the first lens; and
TTL denotes a total optical length from the object side surface of the first lens to an image plane of the camera optical lens along an optic axis.

As an improvement, the camera optical lens further satisfies following conditions:

$-2.36 \leq f2/f \leq -0.62$; and $0.03 \leq d3/TTL \leq 0.15$, where
f2 denotes a focal length of the second lens;
d3 denotes an on-axis thickness of the second lens; and
TTL denotes a total optical length from the object side surface of the first lens to an image plane of the camera optical lens along an optic axis.

As an improvement, the camera optical lens further satisfies a following condition:

$0.11 \leq d5/TTL \leq 0.44$, where TTL denotes a total optical length from the object side surface of the first lens to an image plane of the camera optical lens along an optic axis.

As an improvement, the camera optical lens further satisfies a following condition:

$TTL/IH \leq 1.84$, where
IH denotes an image height of the camera optical lens; and
TTL denotes a total optical length from the object side surface of the first lens to an image plane of the camera optical lens along an optic axis.

As an improvement, the camera optical lens further satisfies a following condition:

$1.00 \leq f12/f \leq 3.92$, where f denotes the total focal length of the camera optical lens; and f12 denotes a combined focal length of the first lens and the second lens.

As an improvement, the camera optical lens further satisfies a following condition:

FOV≥77.00°, where FOV denotes a field of view of the camera optical lens.

As an improvement, the camera optical lens further satisfies a following condition:

FNO≤2.54, where FNO denotes an F number of the camera optical lens.

The present invention has following beneficial effects: the camera optical lens according to the present invention has excellent optical performances, as well as large aperture, wide angle and ultra-thinness properties, which is especially suitable for mobile phone camera lens components composed of high-pixel CCD, CMOS and other imaging elements and WEB camera lens.

BRIEF DESCRIPTION OF DRAWINGS

Many aspects of the exemplary embodiments can be better understood with reference to following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

In order to better illustrate the objectives, technical solutions and advantages of the present invention, the present invention will be described in further detail below with reference to the accompanying drawings and embodiments. It should be understood that the specific embodiments described herein are only used to explain the present invention but are not used to limit the present invention.

Embodiment 1

Figure 1:
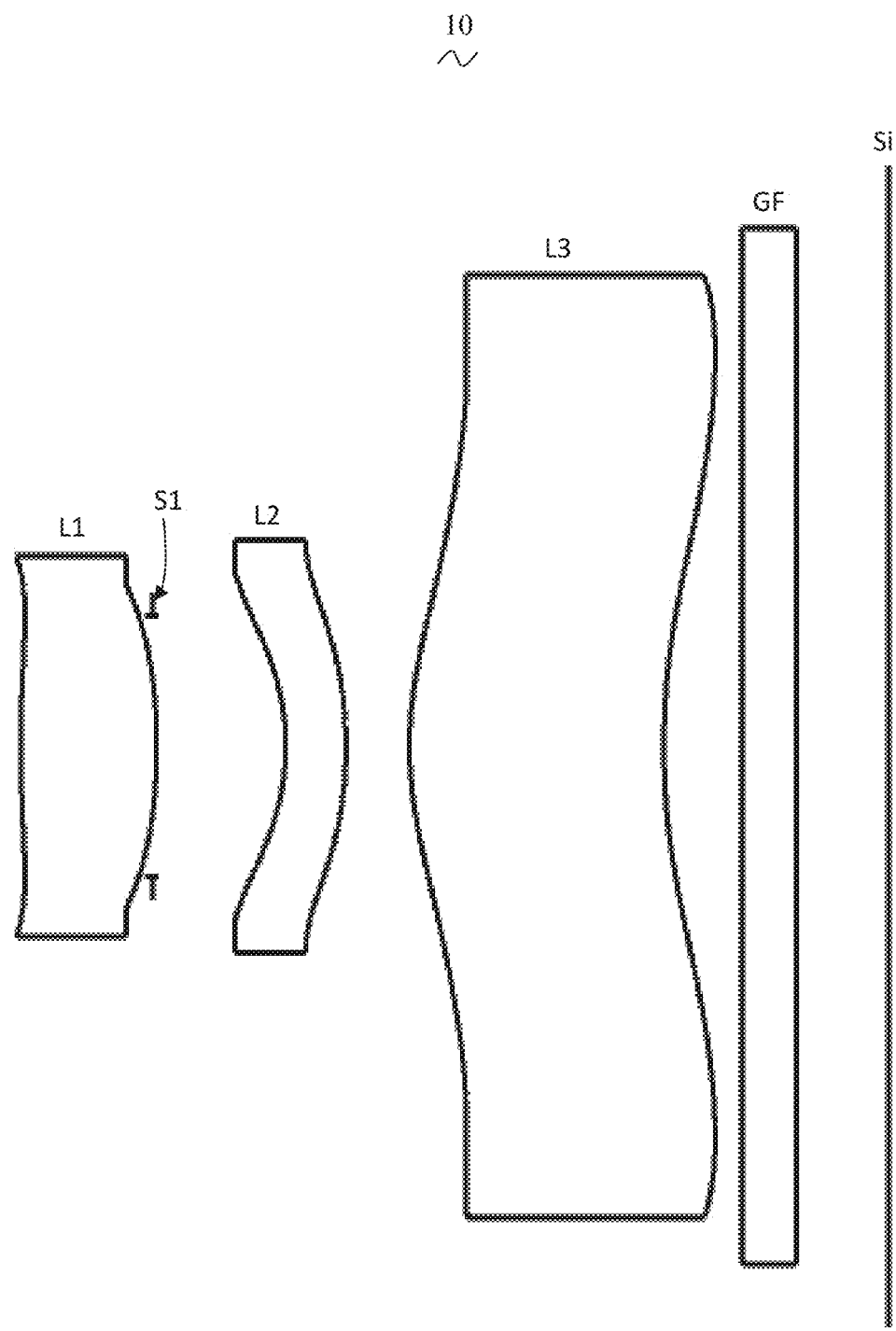
FIG. 1 is a structural schematic diagram of a camera optical lens according to Embodiment 1 of the present invention.

Referring to FIG. 1, the present invention provides a camera optical lens 10. FIG. 1 shows the camera optical lens 10 according to Embodiment 1 of the present invention. The camera optical lens 10 includes three lenses. The camera optical lens 10 includes, from an object side to an image side, a first lens L1, an aperture S1, a second lens L2, and a third lens L3. A glass plate GF may be arranged between the third lens L3 and an image plane Si. The glass plate GF may be a cover glass or an optical filter.

In this embodiment, the first lens L1 has positive refractive power, the second lens L2 has negative refractive power, and the third lens L3 has positive refractive power.

In this embodiment, the first lens L1, the second lens L2, and the third lens L3 are each made of a plastic material.

A total focal length of the camera optical lens 10 is defined as f, a focal length of the first lens L1 is defined as f1, a focal length of the third lens L3 is defined as f3, a curvature radius of an object side surface of the first lens L1 is defined as R1, a curvature radius of an image side surface of the first lens L1 is defined as R2, a curvature radius of an object side surface of the second lens L2 is defined as R3, a curvature radius of an image side surface of the second lens L2 is defined as R4, a curvature radius of an object side surface of the third lens L3 is defined as R5, a curvature radius of an image side surface of the third lens L3 is defined as R6, an on-axis distance from the image side surface of the second lens L2 to the object side surface of the third lens L3 is defined as d4, and an on-axis thickness of the third lens L3 is defined as d5. The focal length f1 and the focal length f, the focal length f3 and the focal length f, the curvature radius R1 and the curvature radius R2, the curvature radius R3 and the curvature radius R4, the curvature radius R5 and the curvature radius R6, the on-axis distance d5 and the on-axis distance d4 satisfy following conditions, respectively:

$$0.75 \leq f1/f \leq 0.95 \quad (1),$$

$$1.20 \leq f3/f \leq 2.00 \quad (2),$$

$$0 \leq (R1+R2)/(R1-R2) \leq 0.80 \quad (3),$$

$$-3.50 \leq (R3+R4)/(R3-R4) \leq -1.50 \quad (4),$$

$$-8.00 \leq (R5+R6)/(R5-R6) \leq -2.50 \quad (5),$$

$$1.50 \leq d5/d4 \leq 4.00 \quad (6).$$

The condition (1) specifies a ratio of the focal length f1 of the first lens L1 to the total focal length f of the camera optical lens 10. Within the range of the condition (1), a spherical aberration and a field curvature of the system may be effectively balanced.

The condition (2) specifies a ratio of the focal length f3 of the third lens L3 to the total focal length f of the camera optical lens 10. With appropriate configuration of the focal length, the system may obtain better imaging quality and lower sensitivity. Optionally, the focal length f3 and the focal length f satisfy a following condition: 1.23≤f3/f≤1.85.

The condition (3) specifies a shape of the first lens L1. Within the range of the condition (3), a degree of deflection of light passing through the lens may be alleviated, and aberrations may be effectively reduced. Optionally, the curvature radius R1 and the curvature radius R2 satisfy a following condition: 0.05≤(R1+R2)/(R1−R2)≤0.78.

The condition (4) specifies a shape of the second lens L2. Within the range of the condition (4), it is beneficial to correct on-axis chromatic aberration. Optionally, the curvature radius R3 and the curvature radius R4 may satisfy a following condition: −3.42≤(R3+R4)/(R3−R4)≤−1.65.

The condition (5) specifies a shape of the third lens L3. Within the range of the condition (5), it is beneficial to correct the aberration of off-axis angle.

The condition (6) specifies a ratio of the on-axis thickness d5 of the third lens L3 to an air spacing d4 between the second lens and the third lens. Within the range of the condition (6), it is beneficial to compress a total length of the optical system, thereby achieving an ultra-thinness effect.

The total focal length of the camera optical lens 10 is defined as f, and a focal length of the second lens L2 is defined as f2. The focal length f2 and the focal length f satisfy a following condition: −1.20≤f2/f≤−0.90, which specifies a ratio of the focal length f2 of the second lens L2 to the total focal length f of the camera optical lens 10. With appropriate configuration of the focal length, the system may obtain better imaging quality and lower sensitivity.

An on-axis thickness of the first lens L1 is defined as d1, and an on-axis distance from the image side surface of the first lens L1 to the object side surface of the second lens L2 is defined as d2. The on-axis thickness d1 and the on-axis distance d2 satisfy a following condition: 1.00≤d1/d2≤2.00, which specifies a ratio of the on-axis thickness d1 of the first lens L1 to an air spacing d2 between the first lens and the second lens. Within the range of the condition, it is beneficial to compress a total length of the optical system, thereby achieving an ultra-thinness effect.

In this embodiment, the object side surface of the first lens L1 is convex in a paraxial region, and the image side surface of the first lens L1 is convex in the paraxial region.

The on-axis thickness of the first lens L1 is defined as d1, and a total optical length of the camera optical lens 10 is defined as TTL. The on-axis thickness d1 and the total optical length TTL satisfy a following condition: 0.08≤d1/TTL≤0.28. Within the range of the condition, it is beneficial to achieve an ultra-thinness effect. Optionally, the on-axis thickness d1 and the total optical length TTL satisfy a following condition: 0.13≤d1/TTL≤0.22.

In this embodiment, the object side surface of the second lens L2 is concave in a paraxial region, and the image side surface of the second lens L2 is convex in the paraxial region.

The total focal length of the camera optical lens 10 is defined as f, and the focal length of the second lens L2 is defined as f2. The focal length f and the focal length f2 satisfy a following condition: −2.36≤f2/f≤−0.62. The negative refractive power of the second lens L2 is controlled in a reasonable range so that it is beneficial to correct aberration of the optical system. Optionally, the focal length f and the focal length f2 satisfy a following condition: −1.47≤f2/f≤−0.77.

A total optical length of the camera optical lens 10 is defined as TTL, and an on-axis thickness of the second lens L2 is defined as d3. The on-axis thickness d3 and the total optical length TTL satisfy a following condition: 0.03≤d3/TTL≤0.15. Within the range of the condition, it is beneficial to achieve an ultra-thinness effect. Optionally, the on-axis thickness d3 and the total optical length TTL satisfy a following condition: 0.06≤d3/TTL≤0.12.

In this embodiment, the object side surface of the third lens L3 is convex in a paraxial region, and the image side surface of the third lens L3 is concave in the paraxial region.

A total optical length of the camera optical lens 10 is defined as TTL, and an on-axis thickness of the third lens L3 is defined as d5. The on-axis thickness d5 and the total optical length TTL satisfy a following condition: 0.11≤d5/TTL≤0.44. Within the range of the condition, it is beneficial to achieve an ultra-thinness effect. Optionally, the on-axis thickness d5 and the total optical length TTL satisfy a following condition: 0.18≤d5/TTL≤0.35.

In this embodiment, an image height of the camera optical lens 10 is defined as IH, and a total optical length of the camera optical lens 10 is defined as TTL. The total optical length TTL and the image height IH satisfy a following condition: TTL/IH≤1.84. Within the range of the condition, it is beneficial to achieve an ultra-thinness effect.

In this embodiment, a field of view FOV of the camera optical lens 10 is greater than or equal to 77.00°, so that a wide-angle effect may be achieved.

In this embodiment, an F number FNO of the camera optical lens is less than or equal to 2.54, so that a large aperture is achieved, thereby obtaining a good imaging performance of the camera optical lens.

In this embodiment, the total focal length of the camera optical lens 10 is f, and the combined focal length of the first lens L1 and the second lens L2 is defined as f12. The focal length f and the focal length f12 satisfy a following condition: 1.00≤f12/f≤3.92. Within the range of the condition, the aberration and distortion of the camera optical lens 10 may be eliminated, and a back focal length of the camera optical lens 10 may be suppressed, so that miniaturization of an imaging lens system may be maintained. Optionally, the focal length f and the focal length f12 satisfy a following condition: 1.60≤f12/f≤3.14.

In addition, in the camera optical lens 10 according to this embodiment, the surface of each lens may be configured to be an aspherical surface. The aspherical surface may be easily made into a shape other than a spherical surface, so that more control variables may be obtained to reduce aberrations, thereby reducing the number of lens used. Therefore, a total length of the camera optical lens 10 may be effectively reduced. In this embodiment, each of the object side surface and the image side surface of each lens is an aspherical surface.

When the focal length of the camera optical lens 10, the focal length and the curvature radius of each lens according to the present invention satisfy the above-mentioned conditions, the camera optical lens 10 may meet the design requirements for large aperture, wide angle and ultra-thinness while maintaining good optical performances. According to performances of the camera optical lens 10, the camera optical lens 10 is especially suitable for mobile phone camera lens components composed of high-pixel CCD, CMOS and other imaging elements and WEB camera lens.

The camera optical lens 10 of the present invention will be described below with examples. The symbols recorded in each example will be described as follows. The focal length, on-axis distance, curvature radius, on-axis thickness, inflection point position, and arrest point position are each in a unit of millimeter (mm).

TTL denotes a total optical length (on-axis distance from the object side surface of the first lens L1 to the image plane Si), with a unit of millimeter (mm);

F number FNO denotes a ratio of an effective focal length of the camera optical lens to an entrance pupil diameter ENPD.

In addition, the object side surface and/or image side surface of each lens may also be provided with inflection points and/or arrest points in order to meet high-quality imaging requirements. The description below may be referred to in specific embodiments as follows.

The design data of the camera optical lens 10 in FIG. 1 are shown below.

Table 1 shows the curvature radius R of the object side surface and the image side surface of the first lens L1 to the third lens L3 which constitute the camera optical lens 10 according to Embodiment 1 of the present invention, the on-axis thickness of each lens, and the distance d between two adjacent lenses, refractive indexes nd and Abbe numbers vd. It should be noted that R and d are each in the unit of millimeter (mm) in this embodiment.

TABLE 1

| | R | d | | nd | | vd |
|---|---|---|---|---|---|---|
| S1 | ∞ | d0= | −0.505 | | | |
| R1 | 3.431 | d1= | 0.523 | nd1 | 1.5444 | v1 | 55.82 |
| R2 | −1.615 | d2= | 0.495 | | | |
| R3 | −0.661 | d3= | 0.230 | nd2 | 1.6610 | v2 | 20.53 |
| R4 | −1.212 | d4= | 0.244 | | | |
| R5 | 1.030 | d5= | 0.976 | nd3 | 1.5346 | v3 | 55.69 |
| R6 | 2.243 | d6= | 0.300 | | | |
| R7 | ∞ | d7= | 0.210 | ndg | 1.5168 | vg | 64.17 |
| R8 | ∞ | d8= | 0.352 | | | |

Each symbol is explained as follows.
S1: aperture;
R: central curvature radius of an optical surface;
R1: curvature radius of the object side surface of the first lens L1;
R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the optical filter GF;
R8: curvature radius of the image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the optical filter GF;
d7: on-axis thickness of the optical filter GF;
d8: on-axis distance from the image side surface of the optical filter GF to the image plane;
nd: refractive index of a d-line;
nd1: refractive index of a d-line of the first lens L1;
nd2: refractive index of a d-line of the second lens L2;
nd3: refractive index of a d-line of the third lens L3;
ndg: refractive index of a d-line of the optical filter GF;
vd: Abbe number;
v1: Abbe number of the first lens L1;
v2: Abbe number of the second lens L2;
v3: Abbe number of the third lens L3;
vg: Abbe number of the optical filter GF.

Table 2 shows aspherical surface data of each lens in the camera optical lens 10 according to Embodiment 1 of the present invention.

TABLE 2

| | Conic coefficient | Aspherical surface coefficient | | | | |
|---|---|---|---|---|---|---|
| | k | A4 | A6 | A8 | A10 | A12 |
| R1 | −9.9000E+01 | 9.6385E−02 | −4.1770E+00 | 5.7666E+01 | −6.1344E+02 | 4.0917E+03 |
| R2 | −4.7867E+01 | −1.6839E+00 | 1.0088E+01 | −8.2284E+01 | 6.2480E+02 | −3.8078E+03 |
| R3 | −5.9175E+00 | −1.5811E+00 | 5.2063E−01 | 6.9548E+01 | −6.6453E+02 | 3.8669E+03 |
| R4 | −2.2397E+01 | −1.7566E+00 | 7.8782E+00 | −4.1596E+01 | 2.3397E+02 | −9.2298E+02 |
| R5 | −6.5495E+00 | −1.1006E−02 | −7.9100E−01 | 2.9317E+00 | −6.1130E+00 | 8.1176E+00 |
| R6 | −1.0842E+00 | 2.4442E−01 | −1.0848E+00 | 1.9041E+00 | −2.0619E+00 | 1.4374E+00 |

| | k | A14 | A16 | A18 | A20 |
|---|---|---|---|---|---|
| R1 | −9.9000E+01 | −1.7050E+04 | 4.3082E+04 | −6.0461E+04 | 3.6160E+04 |
| R2 | −4.7867E+01 | 1.6116E+04 | −4.1503E+04 | 5.4297E+04 | −2.3278E+04 |
| R3 | −5.9175E+00 | −1.4068E+04 | 3.0588E+04 | −3.6378E+04 | 1.8261E+04 |
| R4 | −2.2397E+01 | 2.4321E+03 | −4.0631E+03 | 3.8416E+03 | −1.5532E+03 |
| R5 | −6.5495E+00 | −6.9008E+00 | 3.6178E+00 | −1.0626E+00 | 1.3341E−01 |
| R6 | −1.0842E+00 | −6.4157E−01 | 1.7649E−01 | −2.7193E−02 | 1.7921E−03 |

Here, k denotes a conic coefficient, and A4, A6, A8, A10, A12, A14, A16, A18, and A20 denote an aspherical coefficient, respectively.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (7)$$

Here, x denotes a vertical distance between a point on an aspherical curve and the optical axis, and y denotes a depth of the aspherical surface, i.e., a vertical distance between a point on the aspherical surface having a distance x from the optical axis and a tangent plane tangent to a vertex on an aspherical optical axis.

For convenience, the aspherical surface of each lens surface uses the aspherical surface shown in the above formula (7). However, the present invention is not limited to the aspherical polynomial form shown in the formula (7).

Design data of the inflection point and the arrest point of each lens in the camera optical lens 10 according to Embodiment 1 of the present invention are shown in Tables 3 and 4. Here, P1R1 and P1R2 denote the object side surface and image side surface of the first lens L1, respectively. P2R1 and P2R2 denote the object side surface and image side surface of the second lens L2, respectively. P3R1 and P3R2 denote the object side surface and image side surface of the third lens L3, respectively. Data in an "inflection point position" column is a vertical distance from an inflexion point provided on a surface of each lens to the optical axis of the camera optical lens 10. Data in an "arrest point position" column is a vertical distance from an arrest point provided on the surface of each lens to the optical axis of the camera optical lens 10.

TABLE 3

|  | Number of inflexion points | Inflexion point position 1 | Inflexion point position 2 |
|---|---|---|---|
| P1R1 | 2 | 0.275 | 0.615 |
| P1R2 | 1 | 0.525 | / |
| P2R1 | 1 | 0.415 | / |
| P2R2 | 1 | 0.475 | / |
| P3R1 | 1 | 0.485 | / |
| P3R2 | 1 | 0.645 | / |

TABLE 4

|  | Number of arrest points | Arrest point position 1 |
|---|---|---|
| P1R1 | 1 | 0.435 |
| P1R2 | 0 | / |
| P2R1 | 0 | / |
| P2R2 | 1 | 0.685 |
| P3R1 | 1 | 1.195 |
| P3R2 | 1 | 1.295 |

In addition, Table 17 below shows numerical values according to Embodiment 1 corresponding to the parameters specified in the conditions.

As shown in Table 17, Embodiment 1 satisfies various conditions.

Figure 2:
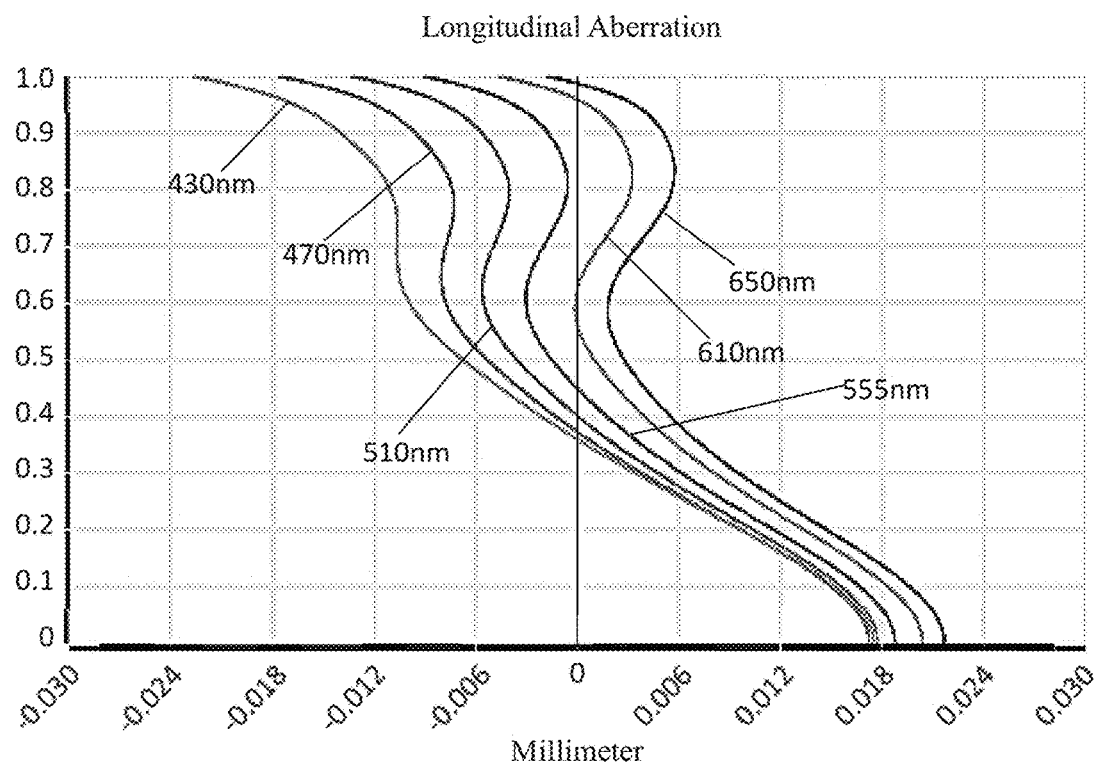
FIG. 2 is a schematic diagram of a longitudinal aberration of the camera optical lens shown in FIG. 1.
Figure 3:
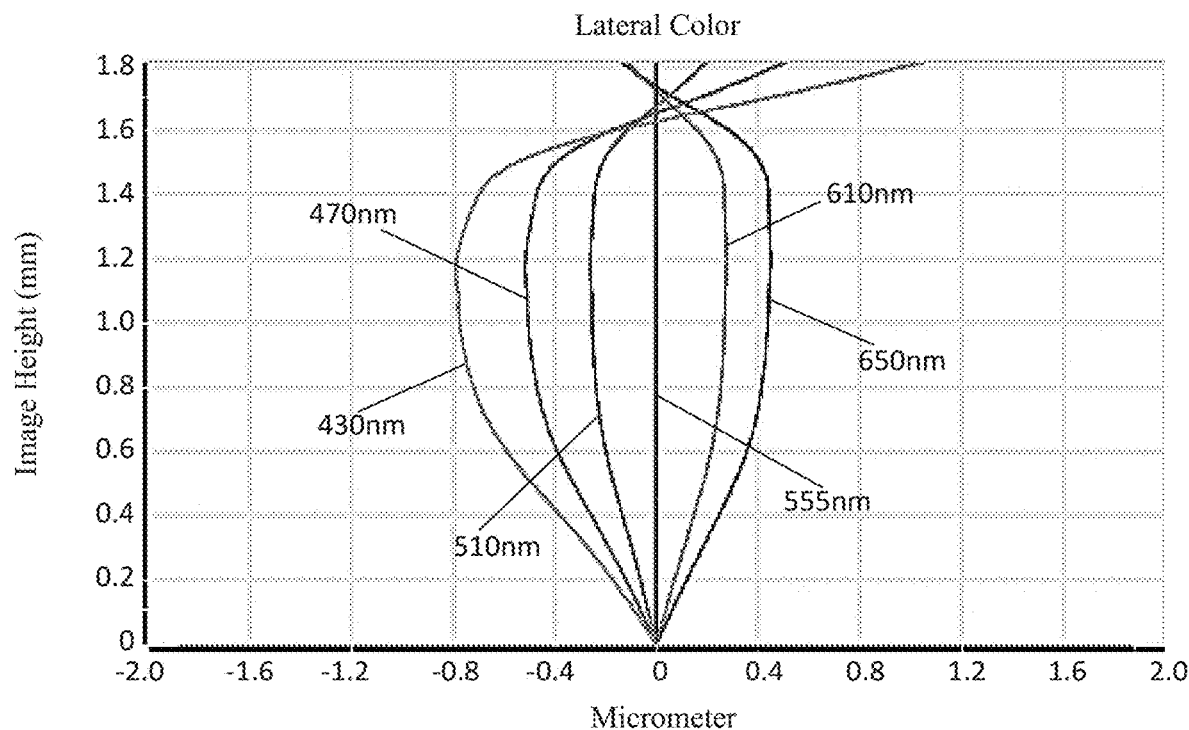
FIG. 3 is a schematic diagram of a lateral color of the camera optical lens shown in FIG. 1.
Figure 4:
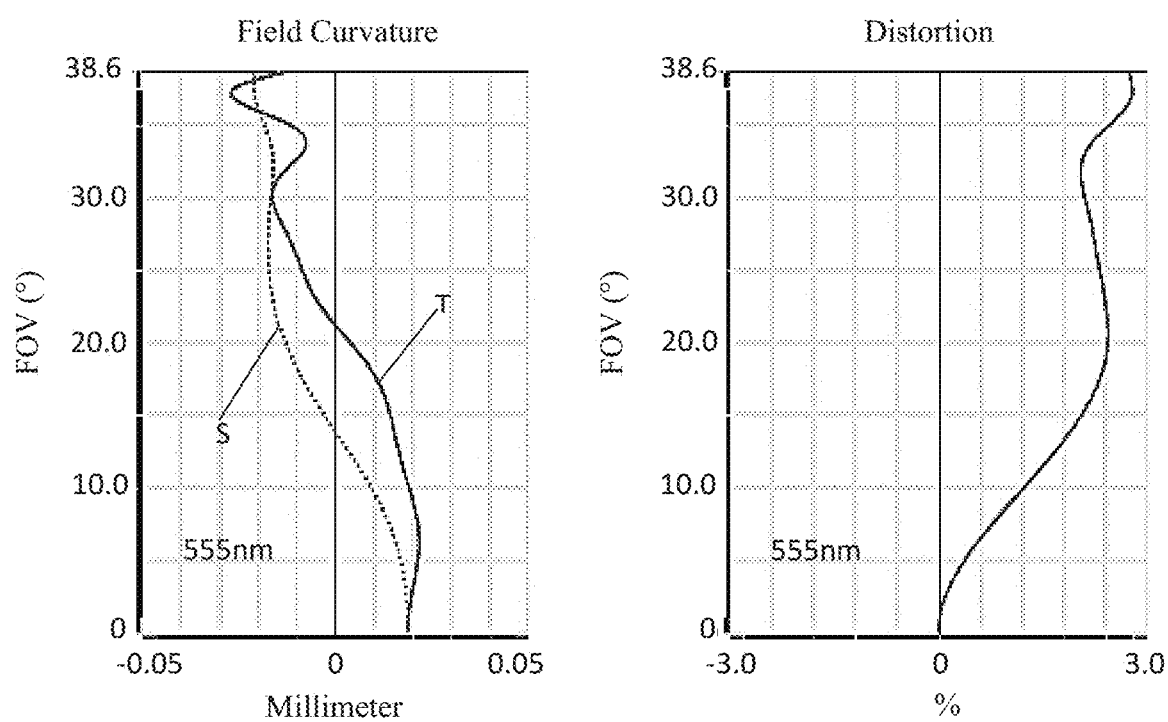
FIG. 4 is a schematic diagram of a field curvature and a distortion of the camera optical lens shown in FIG. 1.

FIG. 2 and FIG. 3 are schematic diagrams of a longitudinal aberration and a lateral color of the camera optical lens 10 after light having a wavelength of 430 nm, 470 nm, 510 nm, 555 nm, 610 nm, and 650 nm passes through the camera optical lens 10 according to Embodiment 1, respectively. FIG. 4 is a schematic diagram of a field curvature and a distortion of the camera optical lens 10 after light having a wavelength of 555 nm passes through the camera optical lens 10 according to Embodiment 1. A field curvature S in FIG. 4 is a field curvature in a sagittal direction, and T is a field curvature in a meridian direction.

In this embodiment, an entrance pupil diameter ENPD of the camera optical lens 10 is 0.904 mm, a full-field image height IH is 1.814 mm, and a field of view FOV in a diagonal direction is 77.20°. The camera optical lens 10 satisfies design requirements for large aperture, wide angle and ultra-thinness. Its on-axis and off-axis chromatic aberrations are fully corrected, thereby achieving excellent optical performances.

Embodiment 2

Figure 5:
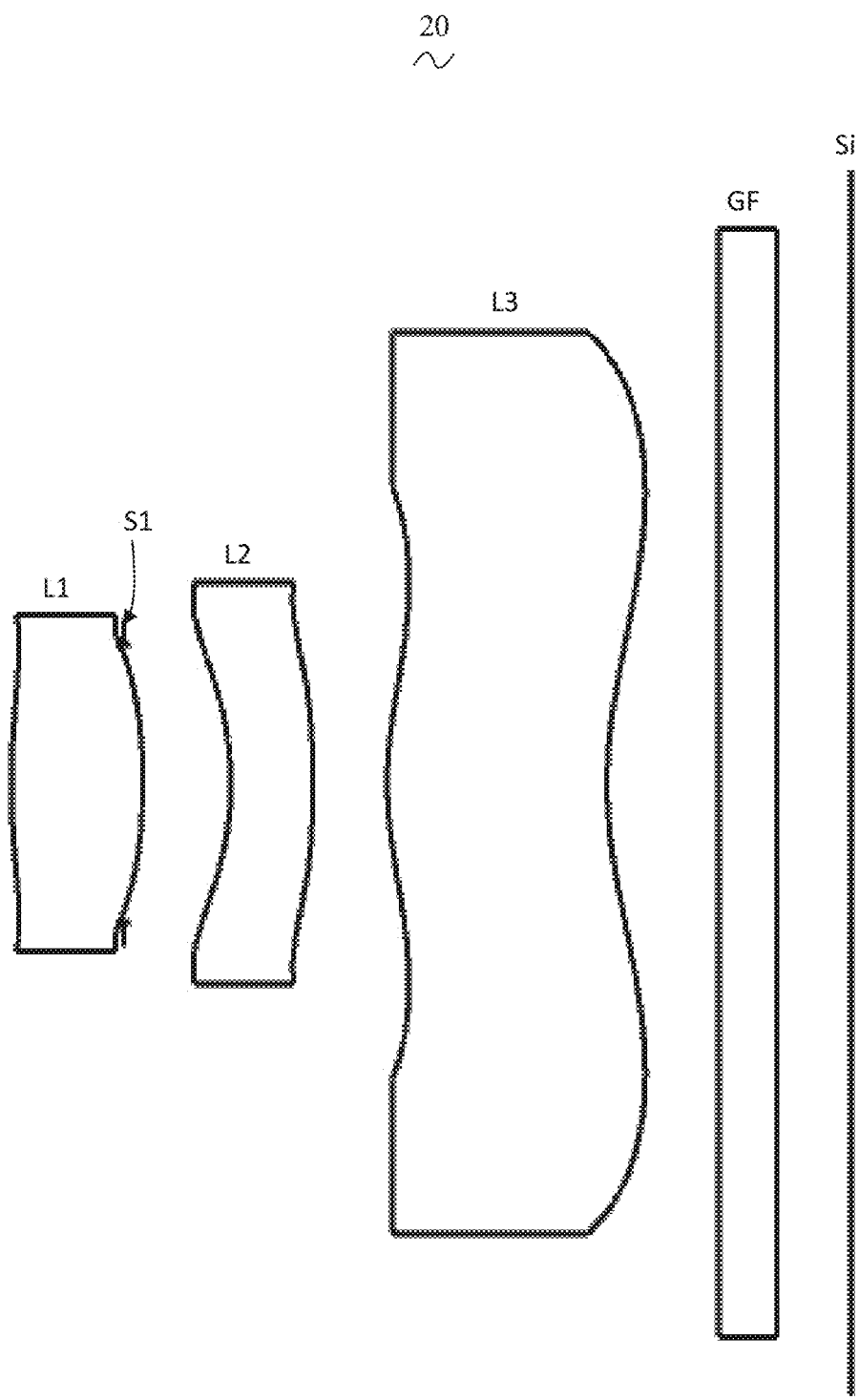
FIG. 5 is a structural schematic diagram of a camera optical lens according to Embodiment 2 of the present invention.

FIG. 5 is a structural schematic diagram of the camera optical lens 20 according to Embodiment 2. Embodiment 2 is basically the same as Embodiment 1, and involves symbols having the same meanings as Embodiment 1 which are not elaborated here.

Table 5 shows design data of the camera optical lens 20 according to Embodiment 2 of the present invention.

TABLE 5

|  | R | d | nd |  | vd |  |
|---|---|---|---|---|---|---|
| S1 | ∞ | d0= −0.402 |  |  |  |  |
| R1 | 2.008 | d1= 0.471 | nd1 | 1.5444 | v1 | 55.82 |
| R2 | −1.535 | d2= 0.314 |  |  |  |  |
| R3 | −0.935 | d3= 0.295 | nd2 | 1.6610 | v2 | 20.53 |
| R4 | −3.271 | d4= 0.266 |  |  |  |  |
| R5 | 0.924 | d5= 0.788 | nd3 | 1.5346 | v3 | 55.69 |
| R6 | 1.190 | d6= 0.400 |  |  |  |  |
| R7 | ∞ | d7= 0.210 | ndg | 1.5168 | vg | 64.17 |
| R8 | ∞ | d8= 0.265 |  |  |  |  |

Table 6 shows aspherical surface data of each lens in the camera optical lens 20 according to Embodiment 2 of the present invention.

TABLE 6

|  | Conic coefficient | Aspherical surface coefficient |  |  |  |  |
|---|---|---|---|---|---|---|
|  | k | A4 | A6 | A8 | A10 | A12 |
| R1 | −9.2514E+01 | 8.6913E−01 | −8.1391E+00 | 9.2899E+00 | 4.4691E+02 | −5.6111E+03 |
| R2 | −3.2785E+01 | −1.7321E+00 | 8.6046E+00 | −6.8684E+01 | 2.9133E+02 | 1.4748E+03 |
| R3 | −7.1749E+00 | −2.1690E+00 | 1.7789E+01 | −1.1798E+02 | 6.4519E+02 | −2.0466E+03 |
| R4 | −4.3541E+01 | −2.1934E+00 | 1.7965E+01 | −1.3227E+02 | 8.1523E+02 | −3.4270E+03 |
| R5 | −1.6690E+01 | 3.5890E−01 | −5.3134E+00 | 2.3261E+01 | −6.2162E+01 | 1.0681E+02 |
| R6 | −9.7110E+00 | 1.2016E−01 | −9.4931E−01 | 1.8770E+00 | −2.1193E+00 | 1.4442E+00 |

TABLE 6-continued

| | Conic coefficient | Aspherical surface coefficient | | | |
|---|---|---|---|---|---|
| | k | A14 | A16 | A18 | A20 |
| R1 | −9.2514E+01 | 3.4004E+04 | −1.1680E+05 | 2.1671E+05 | −1.6942E+05 |
| R2 | −3.2785E+01 | −2.8000E+04 | 1.6037E+05 | −4.2961E+05 | 4.5317E+05 |
| R3 | −7.1749E+00 | 2.5748E+04 | 2.9456E+03 | −1.2161E+04 | 1.0040E+04 |
| R4 | −4.3541E+01 | 9.3251E+03 | −1.5542E+04 | 1.4208E+04 | −5.3406E+03 |
| R5 | −1.6690E+01 | −1.1661E+02 | 7.6978E+01 | −2.7672E+01 | 4.1302E+00 |
| R6 | −9.7110E+00 | −5.9068E−01 | 1.3745E−01 | −1.6227E−02 | 7.4520E−04 |

Design data of the inflection point and the arrest point of each lens in the camera optical lens 20 according to Embodiment 2 of the present invention are shown in Tables 7 and 8.

TABLE 7

| | Number of inflexion points | Inflexion point position 1 | Inflexion point position 2 |
|---|---|---|---|
| P1R1 | 1 | 0.285 | / |
| P1R2 | 0 | / | / |
| P2R1 | 1 | 0.385 | / |
| P2R2 | 1 | 0.415 | / |
| P3R1 | 2 | 0.305 | 0.955 |
| P3R2 | 1 | 0.445 | / |

TABLE 8

| | Number of arrest points | Arrest point position 1 |
|---|---|---|
| P1R1 | 1 | 0.435 |
| P1R2 | 0 | / |
| P2R1 | 0 | / |
| P2R2 | 1 | 0.575 |
| P3R1 | 1 | 0.625 |
| P3R2 | 1 | 0.915 |

In addition, Table 17 below shows numerical values according to Embodiment 2 corresponding to the parameters specified in the conditions.

As shown in Table 17, Embodiment 2 satisfies various conditions.

Figure 6:
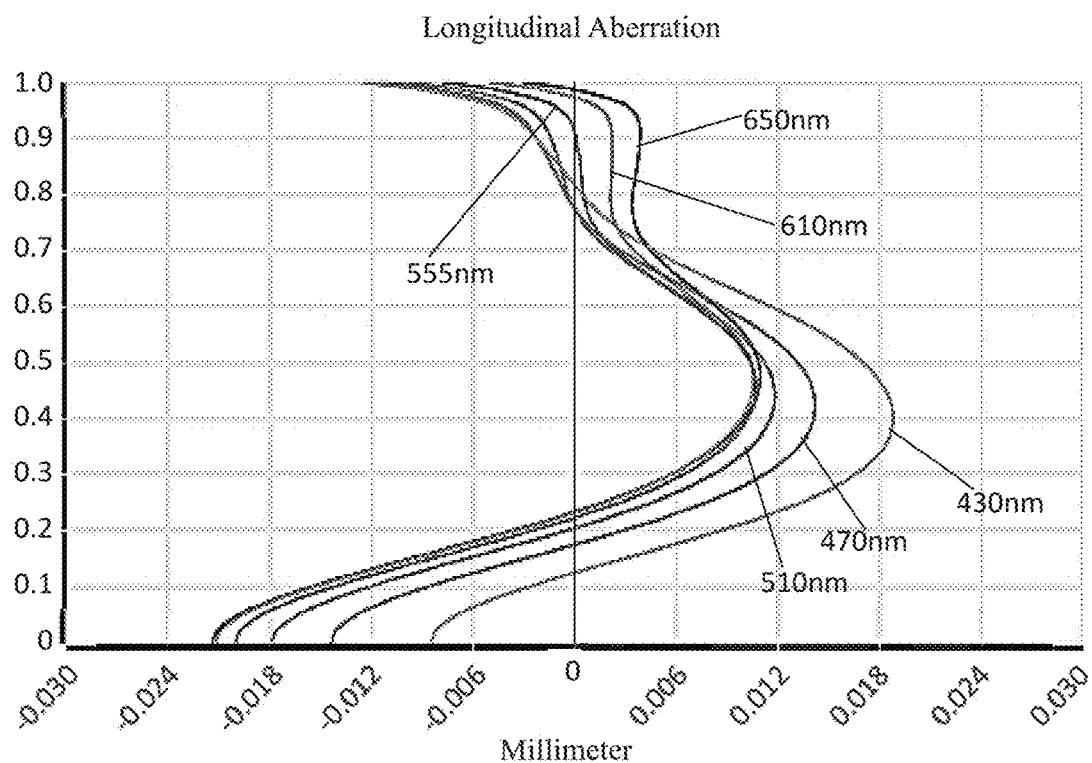
FIG. 6 is a schematic diagram of a longitudinal aberration of the camera optical lens shown in FIG. 5.
Figure 7:
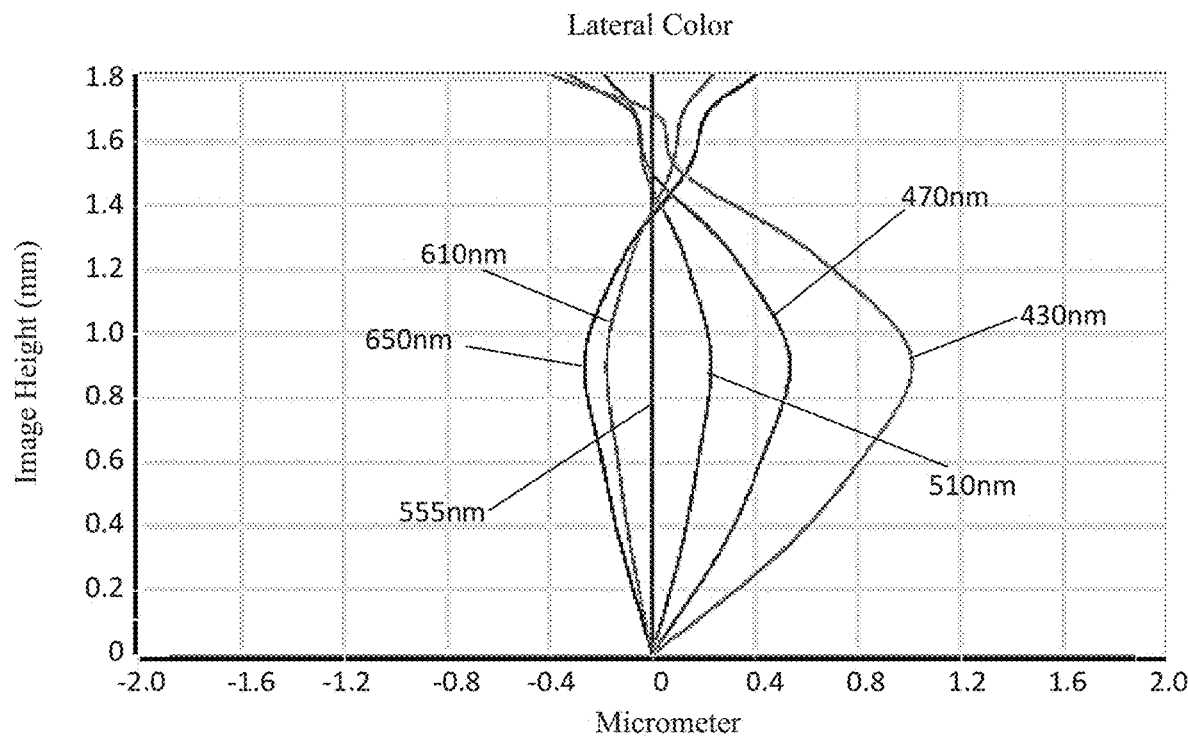
FIG. 7 is a schematic diagram of a lateral color of the camera optical lens shown in FIG. 5.
Figure 8:
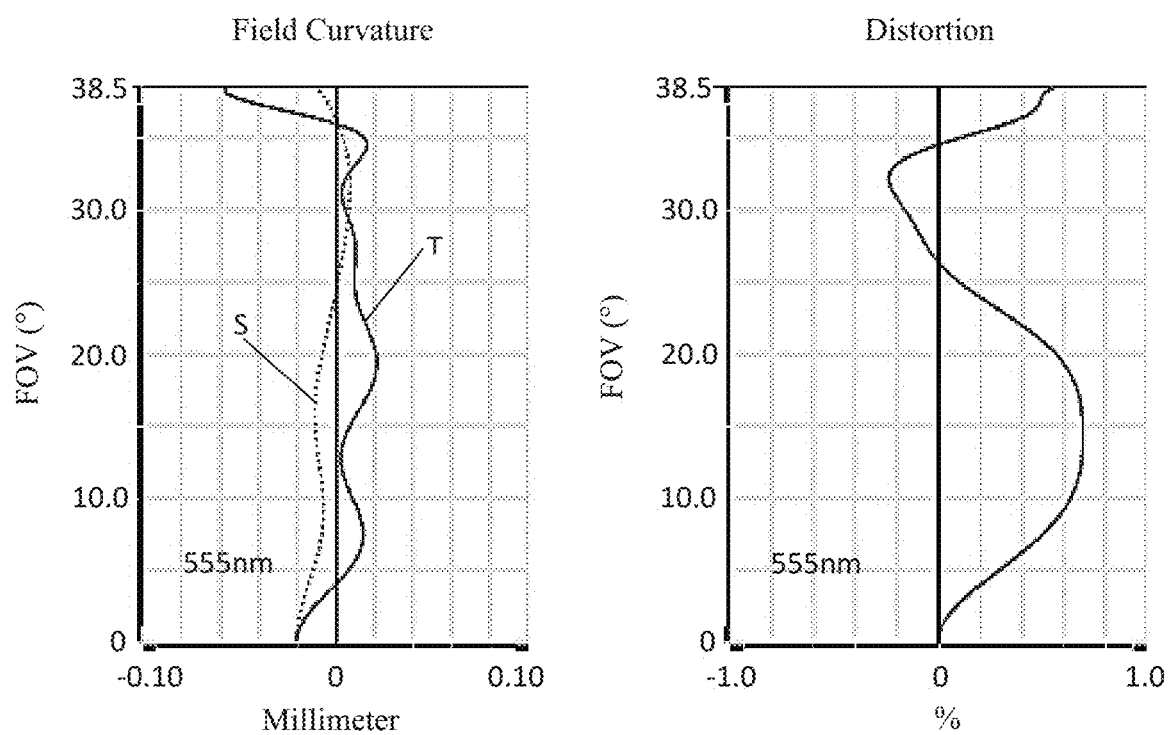
FIG. 8 is a schematic diagram of a field curvature and a distortion of the camera optical lens shown in FIG. 5.

FIG. 6 and FIG. 7 are schematic diagrams of a longitudinal aberration and a lateral color of the camera optical lens 20 after light having a wavelength of 430 nm, 470 nm, 510 nm, 555 nm, 610 nm, and 650 nm passes through the camera optical lens 20 according to Embodiment 2, respectively. FIG. 8 is a schematic diagram of a field curvature and a distortion of the camera optical lens 20 after light having a wavelength of 555 nm passes through the camera optical lens 20 according to Embodiment 2.

In this embodiment, an entrance pupil diameter ENPD of the camera optical lens 20 is 0.904 mm, a full-field image height IH is 1.814 mm, and a field of view FOV in a diagonal direction is 77.00°. The camera optical lens 20 satisfies design requirements for large aperture, wide angle and ultra-thinness. Its on-axis and off-axis chromatic aberrations are fully corrected, thereby achieving excellent optical performances.

Embodiment 3

Figure 9:
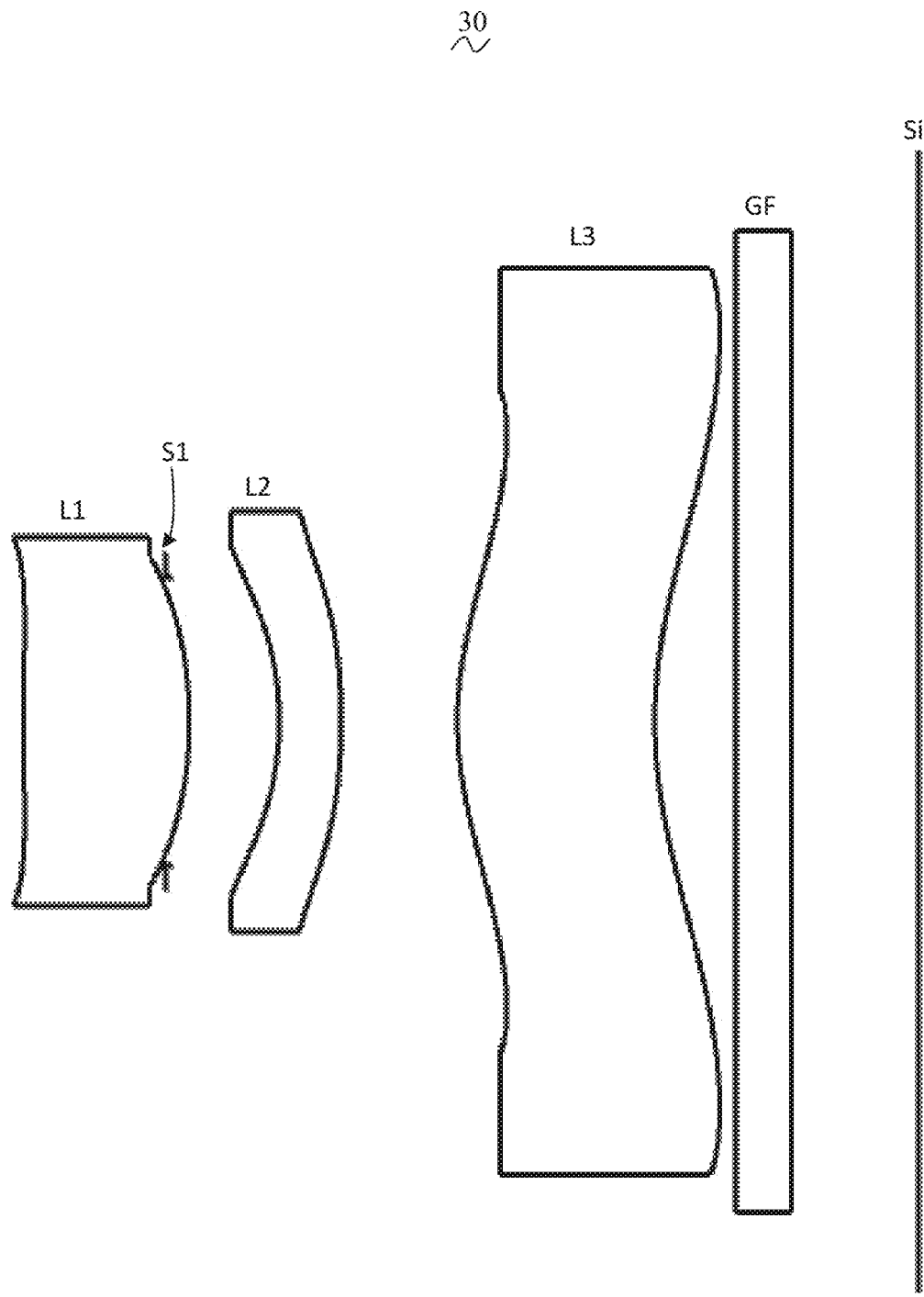
FIG. 9 is a structural schematic diagram of a camera optical lens according to Embodiment 3 of the present invention.

FIG. 9 is a structural schematic diagram of the camera optical lens 30 according to Embodiment 3. Embodiment 3 is basically the same as Embodiment 1, and involves symbols having the same meanings as Embodiment 1 which are not elaborated here.

Table 9 shows design data of the camera optical lens 30 according to Embodiment 3 of the present invention.

TABLE 9

| | R | d | | nd | | vd | |
|---|---|---|---|---|---|---|---|
| S1 | ∞ | d0= | −0.527 | | | | |
| R1 | 7.315 | d1= | 0.618 | nd1 | 1.5441 | v1 | 56.04 |
| R2 | −1.142 | d2= | 0.334 | | | | |
| R3 | −0.884 | d3= | 0.230 | nd2 | 1.6398 | v2 | 23.27 |
| R4 | −2.146 | d4= | 0.432 | | | | |
| R5 | 0.875 | d5= | 0.735 | nd3 | 1.5441 | v3 | 56.04 |
| R6 | 1.257 | d6= | 0.300 | | | | |
| R7 | ∞ | d7= | 0.210 | ndg | 1.5168 | vg | 64.17 |
| R8 | ∞ | d8= | 0.471 | | | | |

Table 10 shows aspherical surface data of each lens in the camera optical lens 30 of Embodiment 3 of the present invention.

TABLE 10

| | Conic coefficient | Aspherical surface coefficient | | | | |
|---|---|---|---|---|---|---|
| | k | A4 | A6 | A8 | A10 | A12 |
| R1 | −9.4709E+01 | −1.8414E−01 | −4.3816E+00 | 8.7516E+01 | −1.0573E+03 | 7.5533E+03 |
| R2 | −1.6912E+01 | −2.0158E+00 | 1.9639E+01 | −2.6427E+02 | 2.5412E+03 | −1.5456E+04 |
| R3 | −4.8297E+00 | −1.7087E+00 | 6.2969E+00 | 1.5189E+01 | −4.9002E+02 | 4.3497E+03 |
| R4 | −2.5299E+01 | −1.9654E+00 | 1.2987E+01 | −9.1136E+01 | 5.3179E+02 | −2.1585E+03 |
| R5 | −1.4576E+01 | 1.0589E+00 | −6.7982E+00 | 2.5032E+01 | −6.1600E+01 | 1.0074E+02 |
| R6 | −4.7763E+00 | 4.6867E−02 | −4.7601E−01 | 1.0525E+00 | −1.4826E+00 | 1.3710E+00 |

TABLE 10-continued

| | Conic coefficient | Aspherical surface coefficient | | | |
|---|---|---|---|---|---|
| | k | A14 | A16 | A18 | A20 |
| R1 | −9.4709E+01 | −3.2961E+04 | 8.6059E+04 | −1.2338E+05 | 7.4445E+04 |
| R2 | −1.6912E+01 | 5.6908E+04 | −1.1774E+05 | 1.1275E+05 | −2.2643E+04 |
| R3 | −4.8297E+00 | −2.0607E+04 | 5.5136E+04 | −7.8623E+04 | 4.6522E+04 |
| R4 | −2.5299E+01 | 5.8261E+03 | −9.9344E+03 | 9.6360E+03 | −4.0358E+03 |
| R5 | −1.4576E+01 | −1.0745E+02 | 7.1549E+01 | −2.6950E+01 | 4.3739E+00 |
| R6 | −4.7763E+00 | −8.1442E−01 | 2.9697E−01 | −6.0317E−02 | 5.2113E−03 |

Design data of the inflection point and the arrest point of each lens in the camera optical lens 30 according to Embodiment 3 of the present invention are shown in Tables 11 and 12.

TABLE 11

| | Number of inflexion points | Inflexion point position 1 | Inflexion point position 2 |
|---|---|---|---|
| P1R1 | 1 | 0.185 | / |
| P1R2 | 0 | / | / |
| P2R1 | 1 | 0.465 | / |
| P2R2 | 1 | 0.525 | / |
| P3R1 | 1 | 0.475 | / |
| P3R2 | 2 | 0.605 | 1.595 |

TABLE 12

| | Number of arrest points | Arrest point position 1 |
|---|---|---|
| P1R1 | 1 | 0.315 |
| P1R2 | 0 | / |
| P2R1 | 0 | / |
| P2R2 | 0 | / |
| P3R1 | 1 | 0.915 |
| P3R2 | 1 | 1.235 |

In addition, Table 17 below shows numerical values according to Embodiment 3 corresponding to the parameters specified in the conditions.

As shown in Table 17, Embodiment 3 satisfies various conditions.

Figure 10:
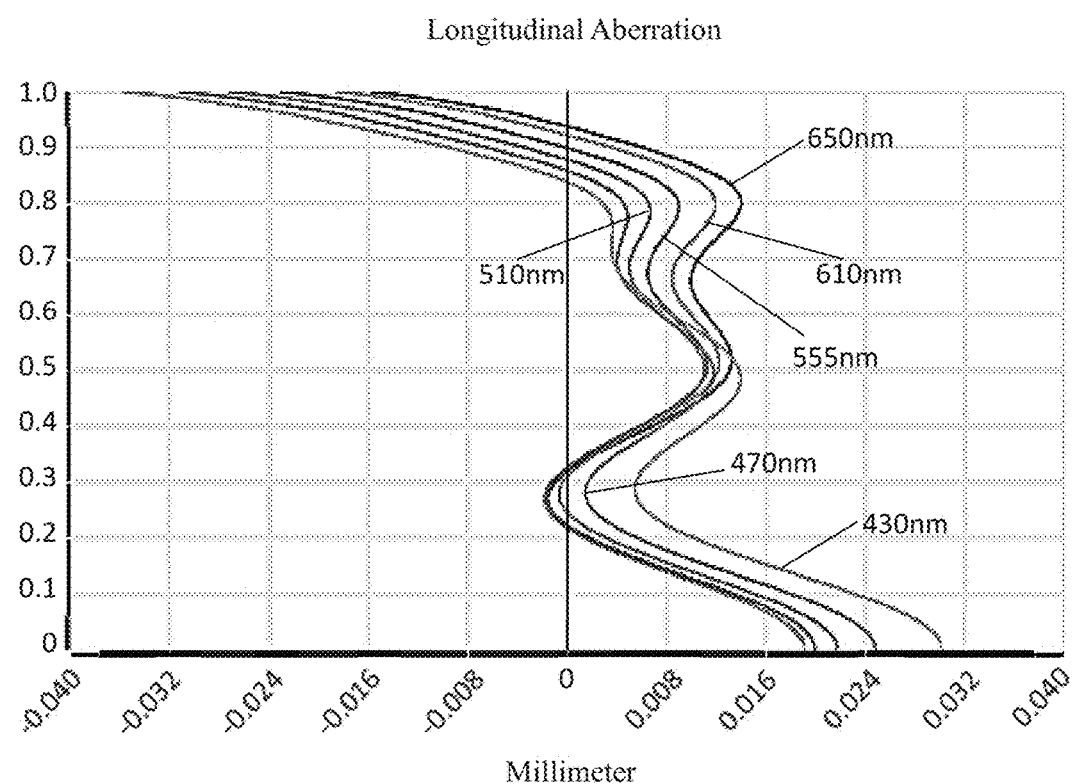
FIG. 10 is a schematic diagram of a longitudinal aberration of the camera optical lens shown in FIG. 9.
Figure 11:
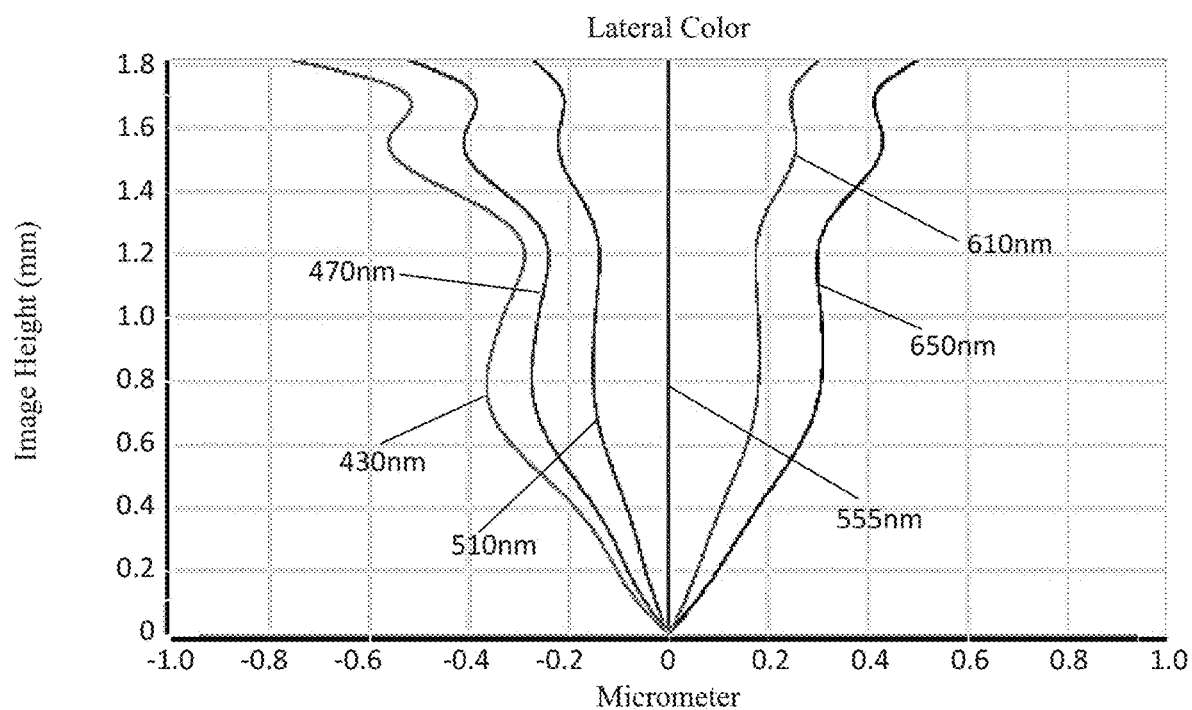
FIG. 11 is a schematic diagram of a lateral color of the camera optical lens shown in FIG. 9.
Figure 12:
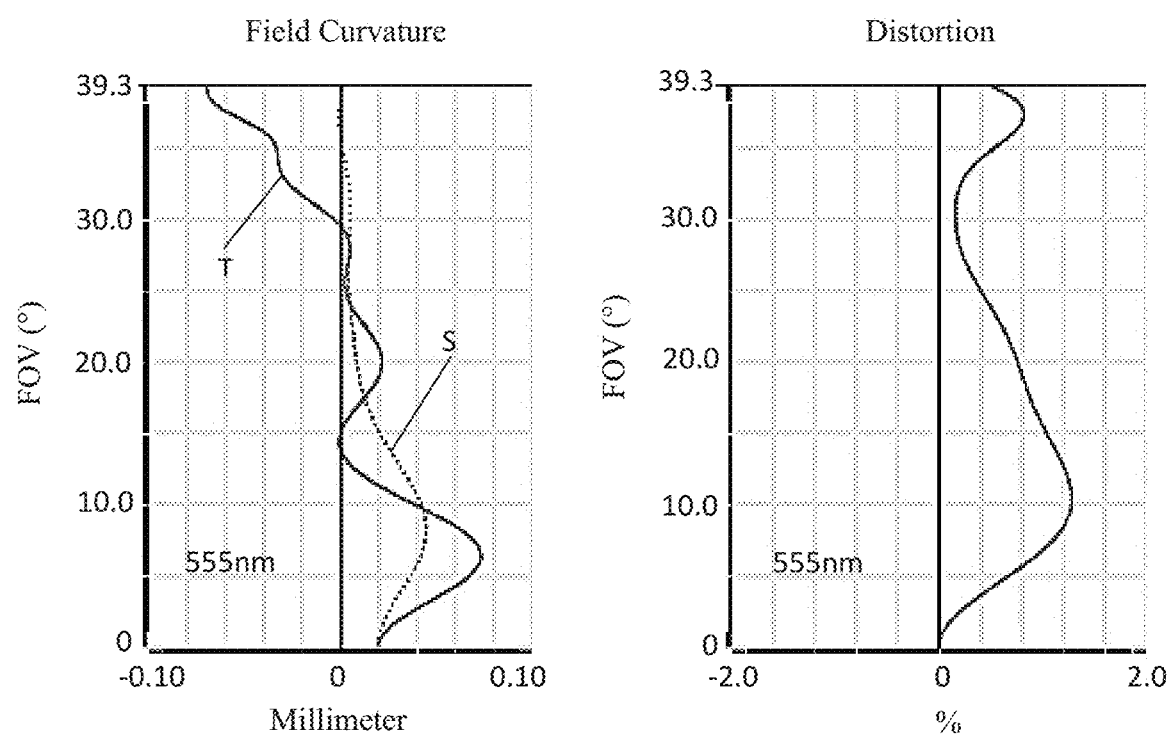
FIG. 12 is a schematic diagram of a field curvature and a distortion of the camera optical lens shown in FIG. 9.

FIG. 10 and FIG. 11 are schematic diagrams of a longitudinal aberration and a lateral color of the camera optical lens 30 after light having a wavelength of 430 nm, 470 nm, 510 nm, 555 nm, 610 nm, and 650 nm passes through the camera optical lens 30 according to Embodiment 3, respectively. FIG. 12 is a schematic diagram of a field curvature and a distortion of the camera optical lens 30 after light having a wavelength of 555 nm passes through the camera optical lens 30 according to Embodiment 3.

In this embodiment, an entrance pupil diameter ENPD of the camera optical lens 30 is 0.904 mm, a full-field image height IH is 1.814 mm, and a field of view FOV in a diagonal direction is 78.60°. The camera optical lens 30 satisfies design requirements for large aperture, wide angle and ultra-thinness. Its on-axis and off-axis chromatic aberrations are fully corrected, thereby achieving excellent optical performances.

Embodiment 4

Figure 13:
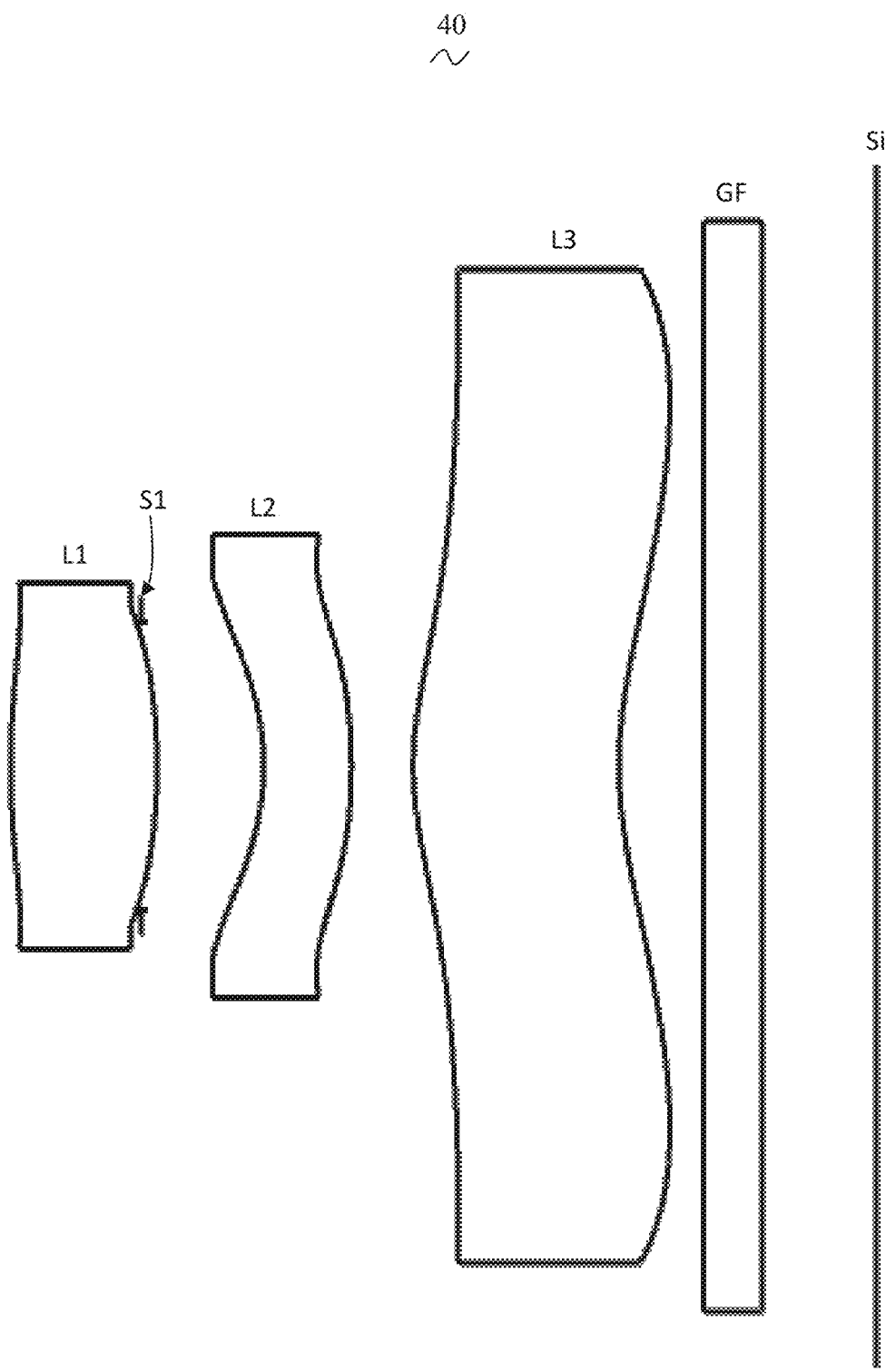
FIG. 13 is a structural schematic diagram of a camera optical lens according to Embodiment 4 of the present invention.

FIG. 13 is a structural schematic diagram of the camera optical lens 40 according to Embodiment 4. Embodiment 4 is basically the same as Embodiment 1, and involves symbols having the same meanings as Embodiment 1 which are not elaborated here.

Table 13 shows design data of the camera optical lens 40 according to Embodiment 4 of the present invention.

TABLE 13

| | R | d | | nd | | vd | |
|---|---|---|---|---|---|---|---|
| S1 | ∞ | d0= | −0.462 | | | | |
| R1 | 2.110 | d1= | 0.519 | nd1 | 1.5444 | v1 | 55.82 |
| R2 | −1.760 | d2= | 0.380 | | | | |
| R3 | −0.748 | d3= | 0.311 | nd2 | 1.6610 | v2 | 20.53 |
| R4 | −1.761 | d4= | 0.221 | | | | |
| R5 | 0.792 | d5= | 0.732 | nd3 | 1.5346 | v3 | 55.69 |
| R6 | 1.069 | d6= | 0.300 | | | | |
| R7 | ∞ | d7= | 0.210 | ndg | 1.5168 | vg | 64.17 |
| R8 | ∞ | d8= | 0.408 | | | | |

Table 14 shows aspherical surface data of each lens in the camera optical lens 40 of Embodiment 4 of the present invention.

TABLE 14

| | Conic coefficient | Aspherical surface coefficient | | | | |
|---|---|---|---|---|---|---|
| | k | A4 | A6 | A8 | A10 | A12 |
| R1 | −8.0051E+01 | 1.0253E+00 | −1.2071E+01 | 7.9198E+01 | −2.8371E+02 | −6.6075E+01 |
| R2 | −8.4755E+01 | −2.4274E+00 | 2.3775E+01 | −2.4405E+02 | 1.7258E+03 | −8.0857E+03 |
| R3 | −6.1492E+00 | −3.1710E+00 | 3.6993E+01 | −4.0616E+02 | 3.5507E+03 | −2.1096E+04 |
| R4 | −9.8687E+01 | −3.9189E+00 | 2.9110E+01 | −1.5534E+02 | 5.9600E+02 | −1.4212E+03 |
| R5 | −8.4477E+00 | −4.7576E−01 | 9.9562E−01 | −1.3953E+00 | 1.2730E+00 | −7.3628E−01 |
| R6 | −1.9102E+00 | −5.8852E−01 | 8.5765E−01 | −9.6316E−01 | 7.8665E−01 | −4.5654E−01 |

TABLE 14-continued

| | Conic coefficient | Aspherical surface coefficient | | | |
|---|---|---|---|---|---|
| | k | A14 | A16 | A18 | A20 |
| R1 | −8.0051E+01 | 4.7762E+03 | −1.8436E+04 | 3.0368E+04 | −1.8963E+04 |
| R2 | −8.4755E+01 | 2.6275E+04 | −6.3545E+04 | 1.0700E+05 | −8.5595E+04 |
| R3 | −6.1492E+00 | 8.2460E+04 | −2.0394E+05 | 2.9025E+05 | −1.8183E+05 |
| R4 | −9.8687E+01 | 1.7784E+03 | −3.9481E+02 | −1.5212E+03 | 1.2220E+03 |
| R5 | −8.4477E+00 | 2.6357E−01 | −5.5969E−02 | 6.4176E−03 | −3.0539E−04 |
| R6 | −1.9102E+00 | 1.7977E−01 | −4.5059E−02 | 6.4241E−03 | −3.9541E−04 |

Design data of the inflection point and the arrest point of each lens in the camera optical lens 40 according to Embodiment 4 of the present invention are shown in Tables 15 and 16.

TABLE 15

| | Number of inflexion points | Inflexion point position 1 | Inflexion point position 2 |
|---|---|---|---|
| P1R1 | 1 | 0.325 | / |
| P1R2 | 0 | / | / |
| P2R1 | 2 | 0.405 | 0.545 |
| P2R2 | 1 | 0.435 | / |
| P3R1 | 1 | 0.335 | / |
| P3R2 | 1 | 0.465 | / |

TABLE 16

| | Number of arrest points | Arrest point position 1 |
|---|---|---|
| P1R1 | 1 | 0.485 |
| P1R2 | 0 | / |
| P2R1 | 0 | / |
| P2R2 | 1 | 0.635 |
| P3R1 | 1 | 1.275 |
| P3R2 | 1 | 1.105 |

In addition, Table 17 below shows numerical values according to Embodiment 4 corresponding to the parameters specified in the conditions.

As shown in Table 17, Embodiment 4 satisfies various conditions.

Figure 14:
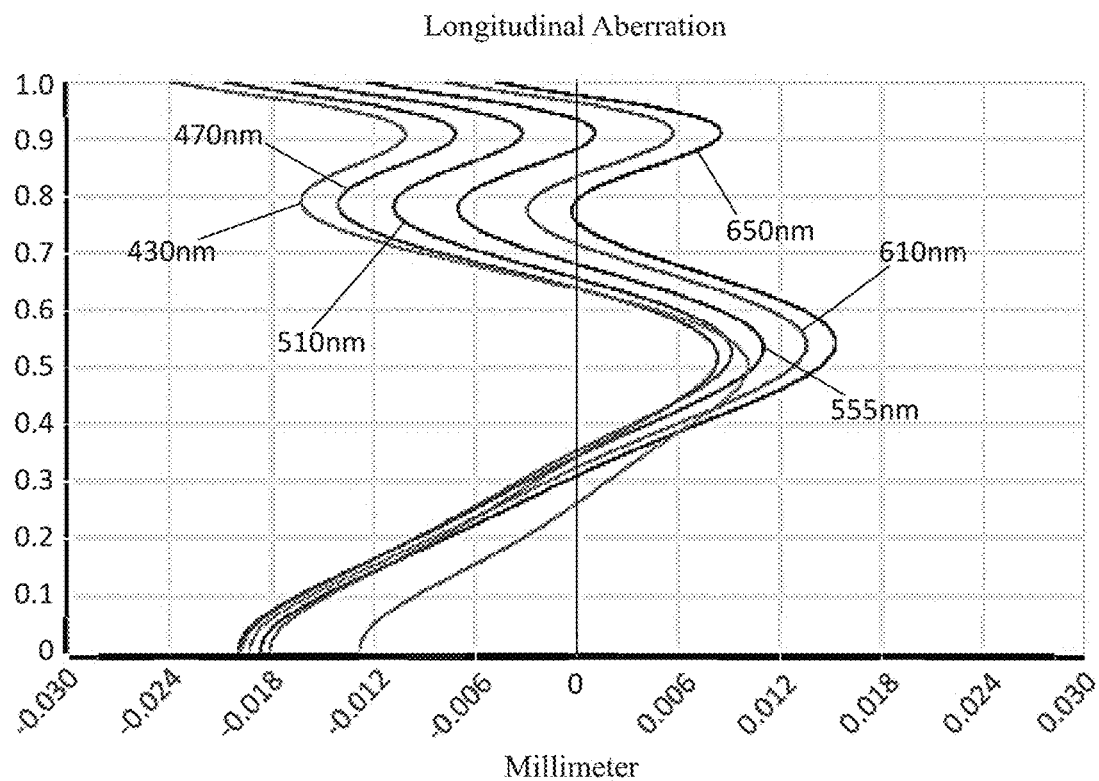
FIG. 14 is a schematic diagram of a longitudinal aberration of the camera optical lens shown in FIG. 13.
Figure 15:
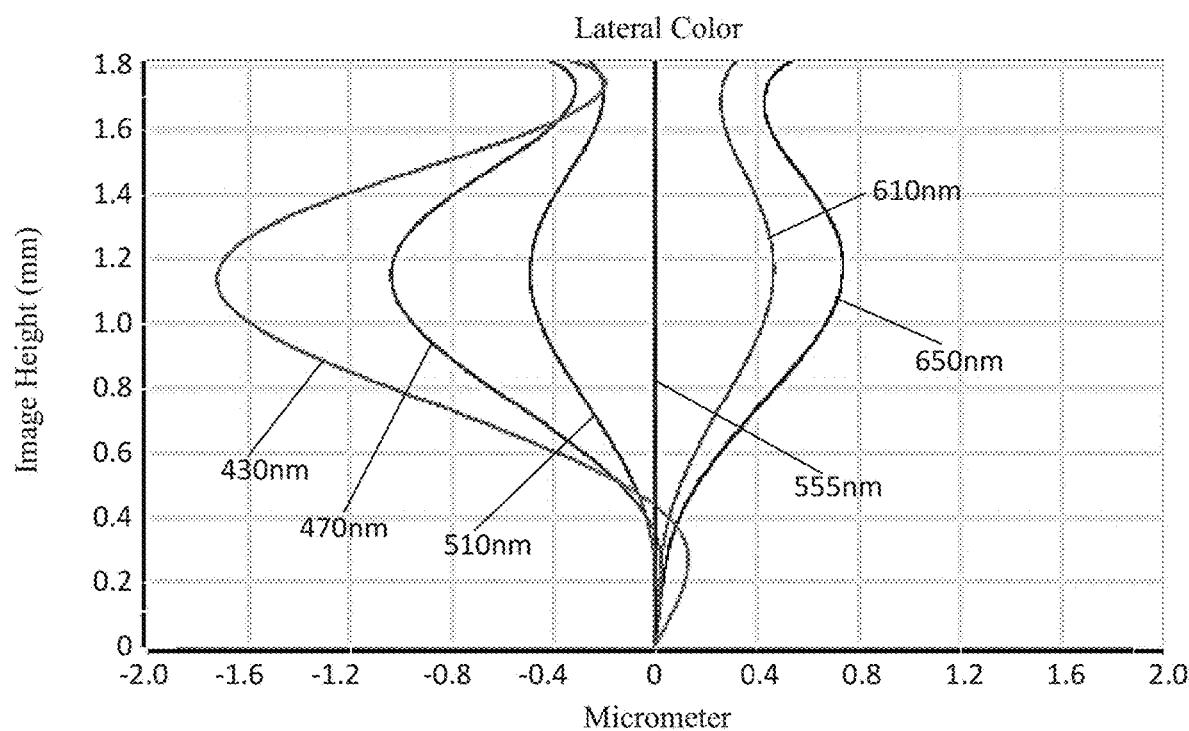
FIG. 15 is a schematic diagram of a lateral color of the camera optical lens shown in FIG. 13.
Figure 16:
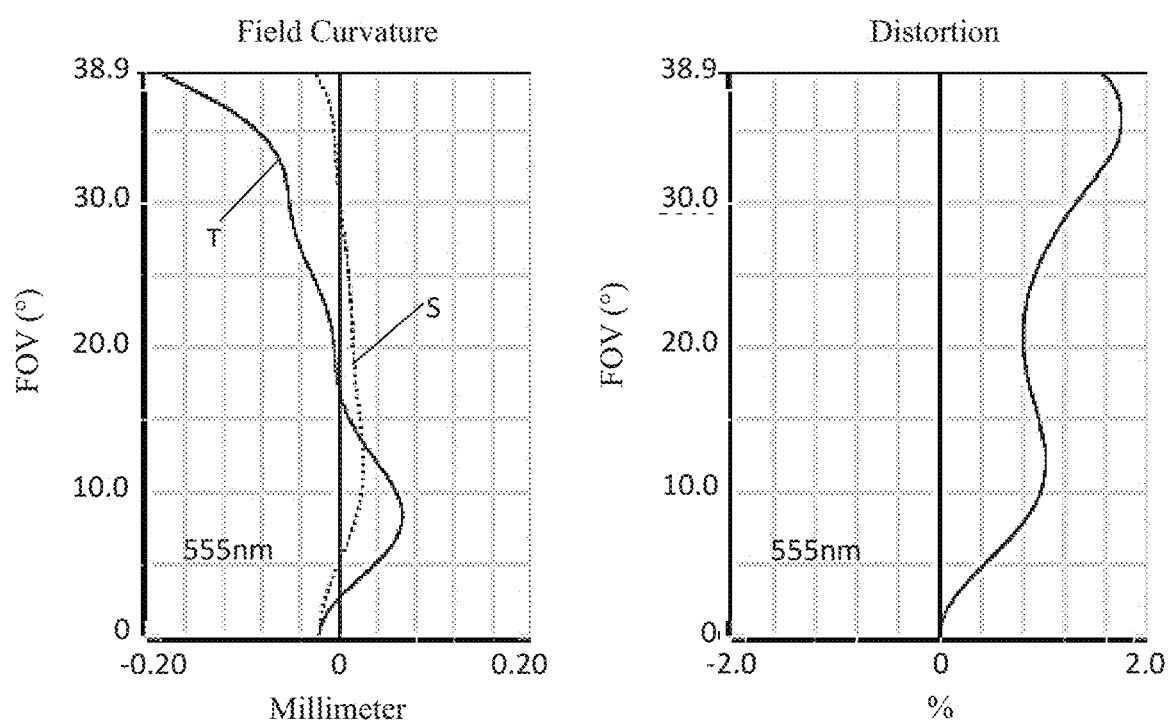
FIG. 16 is a schematic diagram of a field curvature and a distortion of the camera optical lens shown in FIG. 13.

FIG. 14 and FIG. 15 are schematic diagrams of a longitudinal aberration and a lateral color of the camera optical lens 40 after light having a wavelength of 430 nm, 470 nm, 510 nm, 555 nm, 610 nm, and 650 nm passes through the camera optical lens 40 according to Embodiment 4, respectively. FIG. 16 is a schematic diagram of a field curvature and a distortion of the camera optical lens 40 after light having a wavelength of 555 nm passes through the camera optical lens 40 according to Embodiment 4.

In this embodiment, an entrance pupil diameter ENPD of the camera optical lens 40 is 0.904 mm, a full-field image height IH is 1.814 mm, and a field of view FOV in a diagonal direction is 77.80°. The camera optical lens 40 satisfies design requirements for large aperture, wide angle and ultra-thinness. Its on-axis and off-axis chromatic aberrations are fully corrected, thereby achieving excellent optical performances.

Table 17 below shows the numerical values of the conditions and their associated parameters defined in Embodiments 1 to 4.

TABLE 17

| Parameters and conditions | Embodiment 1 | Embodiment 2 | Embodiment 3 | Embodiment 4 |
|---|---|---|---|---|
| f | 2.220 | 2.229 | 2.210 | 2.174 |
| f1 | 2.087 | 1.672 | 1.856 | 1.845 |
| f2 | −2.619 | −2.066 | −2.430 | −2.221 |
| f3 | 2.774 | 3.788 | 3.208 | 2.966 |
| f12 | 5.806 | 4.466 | 5.248 | 5.392 |
| FNO | 2.46 | 2.47 | 2.45 | 2.41 |
| TTL | 3.330 | 3.009 | 3.330 | 3.081 |
| IH | 1.814 | 1.814 | 1.814 | 1.814 |
| FOV | 77.20° | 77.00° | 78.60° | 77.80° |
| f1/f | 0.94 | 0.75 | 0.84 | 0.85 |
| f3/f | 1.25 | 1.70 | 1.45 | 1.36 |
| (R1 + R2)/(R1 − R2) | 0.36 | 0.13 | 0.73 | 0.09 |
| (R3 + R4)/(R3 − R4) | −3.40 | −1.80 | −2.40 | −2.48 |
| (R5 + R6)/(R5 − R6) | −2.70 | −7.95 | −5.58 | −6.72 |
| d5/d4 | 4.00 | 2.96 | 1.70 | 3.31 |

The above are only preferred embodiments of the present disclosure. Here, it should be noted that those skilled in the art may make modifications without departing from the inventive concept of the present disclosure, but these shall fall into the protection scope of the present disclosure.

What is claimed is:

1. A camera optical lens, comprising from an object side to an image side:
   a first lens having positive refractive power;
   a second lens having negative refractive power; and
   a third lens having positive refractive power,
   wherein the camera optical lens satisfies following conditions:

$0.75 \leq f1/f \leq 0.95$;

$1.20 \leq f3/f \leq 2.00$;

$0 \leq (R1+R2)/(R1-R2) \leq 0.80$;

$-3.50 \leq (R3+R4)/(R3-R4) \leq -1.50$;

$-8.00 \leq (R5+R6)/(R5-R6) \leq -2.50$; and $1.50 \leq d5/d4 \leq 4.00$, where
   f denotes an total focal length of the camera optical lens;
   f1 denotes a focal length of the first lens;
   f3 denotes a focal length of the third lens;
   R1 denotes a curvature radius of an object side surface of the first lens;
   R2 denotes a curvature radius of an image side surface of the first lens;

R3 denotes a curvature radius of an object side surface of the second lens;

R4 denotes a curvature radius of an image side surface of the second lens;

R5 denotes a curvature radius of an object side surface of the third lens;

R6 denotes a curvature radius of an image side surface of the third lens;

d4 denotes an on-axis distance from the image side surface of the second lens to the object side surface of the third lens; and d5 denotes an on-axis thickness of the third lens.

2. The camera optical lens as described in claim 1, wherein the camera optical lens further satisfies a following condition:

$$-1.20 \leq f2/f \leq -0.90,$$

where f2 denotes a focal length of the second lens.

3. The camera optical lens as described in claim 1, wherein the camera optical lens further satisfies a following condition:

$$1.00 \leq d1/d2 \leq 2.00,$$

where d1 denotes an on-axis thickness of the first lens; and d2 denotes an on-axis distance from the image side surface of the first lens to the object side surface of the second lens.

4. The camera optical lens as described in claim 1, wherein the camera optical lens further satisfies a following condition:

$$0.08 \leq d1/TTL \leq 0.28,$$

where d1 denotes an on-axis thickness of the first lens; and

TTL denotes a total optical length from the object side surface of the first lens to an image plane of the camera optical lens along an optic axis.

5. The camera optical lens as described in claim 1, wherein the camera optical lens further satisfies following conditions:

$$-2.36 \leq f2/f \leq -0.62; \text{ and}$$

$$0.03 \leq d3/TTL \leq 0.15,$$

where f2 denotes a focal length of the second lens;

d3 denotes an on-axis thickness of the second lens; and

TTL denotes a total optical length from the object side surface of the first lens to an image plane of the camera optical lens along an optic axis.

6. The camera optical lens as described in claim 1, wherein the camera optical lens further satisfies a following condition:

$$0.11 \leq d5/TTL \leq 0.44,$$

where TTL denotes a total optical length from the object side surface of the first lens to an image plane of the camera optical lens along an optic axis.

7. The camera optical lens as described in claim 1, wherein the camera optical lens further satisfies a following condition:

$$TTL/IH \leq 1.84,$$

where

IH denotes an image height of the camera optical lens; and

TTL denotes a total optical length from the object side surface of the first lens to an image plane of the camera optical lens along an optic axis.

8. The camera optical lens as described in claim 1, wherein the camera optical lens further satisfies a following condition:

$$1.00 \leq f12/f \leq 3.92,$$

where f12 denotes a combined focal length of the first lens and the second lens.

9. The camera optical lens as described in claim 1, wherein the camera optical lens further satisfies a following condition:

$$FOV \geq 77.00°,$$

where FOV denotes a field of view of the camera optical lens.

10. The camera optical lens as described in claim 1, wherein the camera optical lens further satisfies a following condition:

$$FNO \leq 2.54,$$

where FNO denotes an F number of the camera optical lens.

* * * * *